Sept. 29, 1964  T. J. BUCKLEY ETAL  3,150,702
SELF-LOCKING BOLT WITH PUNCHED RECESS
AND METHOD OF MAKING SAME
Filed May 2, 1961
FIG.1.
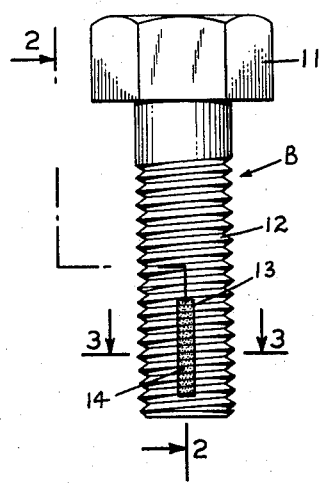
FIG.2.
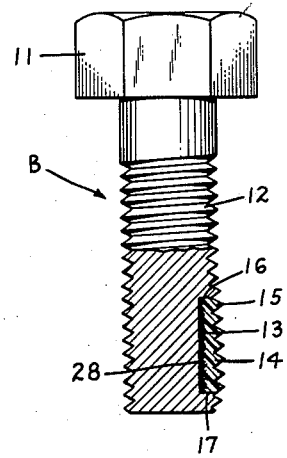
FIG.3.
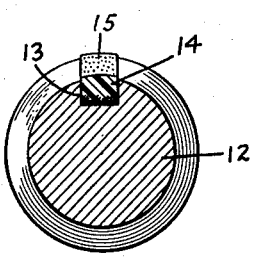
FIG.4.
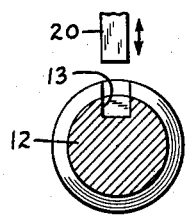
FIG.6.
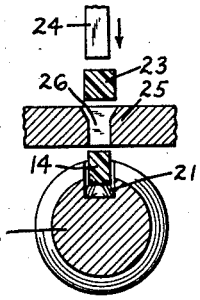
FIG.5.
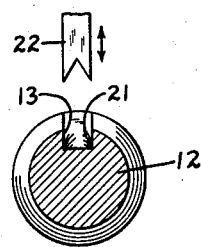
FIG.7.
INVENTORS:
TIMOTHY J. BUCKLEY
CLYDE R. BEUTER
JOHN W. BRIGHTMAN
BY
Brumbaugh, Free, Graves, Donohue
THEIR ATTORNEYS United States Patent Office 3,150,702
Patented Sept. 29, 1964

3,150,702
SELF-LOCKING BOLT WITH PUNCHED RECESS
AND METHOD OF MAKING SAME
Timothy J. Buckley, Ridgewood, Clyde R. Beuter, Franklin Lakes, and John W. Brightman, Ridgewood, N.J., assignors to The Nylok Corporation, Paramus, N.J., a corporation of Delaware
Filed May 2, 1961, Ser. No. 107,199
3 Claims. (Cl. 151—7)

This invention relates to improvements in self-locking, threaded fastening devices, and it relates particularly to improvements in fastening devices such as bolts, screws or the like, which include an elongated insert of an elastomeric material such as "Nylon" (a high molecular weight linear polyamide) for rendering the device self-locking.

It has been proposed heretofore to insert a strip of vulcanized fiber or of an elastomeric plastic material in a slot extending lengthwise of and intersecting a plurality of threads of a bolt, screw or the like. The resulting fasteners have not been wholly satisfactory for several reasons. One of the principal problems involved is in retaining such an insert or strip in the slot after it has been inserted. The inserts have projecting ends which can and do engage other similar fastening devices in a box or bag so that may of the inserts are dislodged and lost as the boxes or bags are handled or transported. This difficulty is increased by reason of the fact that in many of these fastening devices, one end of the strip insert is exposed at the end of the bolt or screw.

Another difficulty arises because of the manner in which the slot is formed in the screw. Usually the slot is cut with a circular milling cutter which is engaged with the screw and then moved lengthwise of the screw to form an elongated flat bottom slot having one or both ends curved. Such curved ends tend to wedge the insert out of the slot if it is moved endwise as by engagement with a nut being threaded on the fastening device.

In accordance with the present invention, the above-mentioned disadvantages of the prior strip insert fastening devices are overcome by a simplified yet highly effective method of forming the slot and introducing a strip insert into the slot. Moreover a greatly improved product is obtained in which the strip insert is retained securely in the slot during shipping or handling and is held against endwise movement as the fastening device is screwed into a complementally threaded member.

More particularly, in accordance with the present invention, the slot is formed in the fastening device by a punching operation, thereby enabling the formation of a slot which has ends extending perpendicular to the axis of the screw and providing abutments for engaging the ends of the insert strip to restrain it against endwise movement. The slot also may be provided with additional retaining means for the insert and burrs resulting from the slot punching operation can be removed by shaving the sides of the slot with a suitable shaving punch to form integral shavings in the slot which are embedded in the insert when it is inserted in the slot.

Introduction of the strip insert into the slot is facilitated by compressing it to a transverse dimension less than the width of the slot before it is inserted. Following introduction of the insert into the slot, it is compressed and expanded to fit tightly in the slot with the metal shavings at the bottom of the slot locking the insert securely in the fastening device.

For a better understanding of the present invention, reference may be had to the accompanying drawings, in which:

FIGURE 1 is a view in side elevation of a typical male threaded fastening element of the type embodying the present invention;

FIGURE 2 is a view in elevation and partly in section taken on line 2—2 of FIGURE 1;

FIGURE 3 is a view in cross section taken on line 3—3 of FIGURE 1; and

FIGURES 4, 5, 6 and 7 are schematic illustrations of the procedural steps involved in the manufacture of a bolt of the type embodying the present invention.

The form of the present invention chosen for purposes of illustration is a bolt B although it may be any other threaded fastening member, such as a machine screw, socket head screw, cap screw, reducing insert or the like. The bolt B has a head 10 and a shank 11 having threads 12 thereon extending completely or partially along the length thereof. Formed in the threaded portion of the shank 11 is an elongated slot 13, the formation of which is described in greater detail hereinafter. Mounted in the slot is a resilient insert 14 of elastomeric material, such as "Nylon" or other similar synthetic resin, plastic, synthetic rubber or the like. As shown in FIGURE 2, the insert has threads 15 formed thereon which are in alignment with and project somewhat beyond the crests of the threads 12 so that the insert is compressed when the bolt is inserted in the complementally threaded member. Compression of the insert produces a reaction force urging the threads on the opposite side of the bolt B from the insert 14 against the threads of the complementally threaded member.

A feature of the fastening device is the provision of the right angularly-related ends 16 and 17 of the slot 13 which form abutment surfaces for the ends of the insert 14 thereby aiding in preventing the endwise shifting of the insert relative to the bolt. The manner in which the slot is formed and the insert is cut and inserted will now be described. Referring to FIGURE 4, the slot 13 is formed by means of a punching operating with a suitable hardened steel punch 20 of any suitable or selected shape. As illustrated, the punch has a generally rectangular cross section with parallel sides in order to form a slot 13 of the type described above. An advantage of punching the slot 13 in the bolt is that no metal is removed and, as a consequence, the bolt is not appreciably weakened. Also, a punching operation enables the square ends 16 and 17 to be formed effectively and inexpensively at the opposite ends of the slot 13. The punching operation may produce burrs at the portions of the threads 12 adjacent to the slot. As shown in FIGURE 5, the sides of the slot may be shaved to remove the burrs and also to form metal shavings 21 in the slot integral with the bolt which aid in positioning the insert in the groove. Such a shaving operation can be accomplished by means of a double edge punch 22 such as that shown in FIGURE 5.

The insert strip 14 may be cut from an elongated strip of elastomeric material 23 shown in FIGURE 6, by means of a punch 24 and a compression die 25. A cutter for this purpose is disclosed in the Beuter and Brightman U.S. application Serial No. 91,811 filed February 27, 1961. The punch 24 descends upon the strip 23 cutting the insert 14 from it and forcing it through a die opening 26 in the die 25 which is narrower than the strip thereby compressing it to a cross-section narrower than the width of the slot 13. In such a compressed condition, the insert 14 can be pushed easily into the slot 13 by continued downward movement of the punch 24. The insert 14 is compressed by the punch against the shavings 21 near the bottom of the slot which penetrate the insert and aid in retaining it against the movement endwise and outwardly of the slot 13. The pressure exerted by the punch 24 also compresses or coins the insert radially and expands it transversely into tight engagement with the sides of the slot thereby further securing the insert in the slot. The pressure applied with the punch sets the insert in expanded condition. After the insert has been compressed or coined in the groove 13, it may be provided with threads by means of a thread-forming punch 27 as shown in FIG. 7. The punch bevels the ends of the insert so that no square corners are exposed at the ends of the insert which might cause the insert to be dislodged from the slot.

The shavings in the bottom of the groove leave small expansion spaces 28 (FIGURE 3) behind the insert which enables the strip to be displaced inwardly to avoid overcompression and extrusion thereof by the complementally-threaded member in which the bolt is inserted.

It will be understood that the material from which the insert 14 is formed can be varied depending upon the conditions under which the bolt is to be used. Thus, for ordinary normal temperature usage, a lower melting elastomer such as "Nylon" may be used. For higher temperature operations, a higher melting elastomer may be used.

In some instances, it may be desirable to omit the threads 15 from the insert and in that event, the insert will be of such dimensions that it projects beyond the root lines of the threads 12 and preferably to adjacent the crest lines of these threads. The ends of the insert should, however, be beveled or mitered as described above to reduce the possibility of its dislodgment from the slot.

From the foregoing, it will be clear that the form of the invention described herein is illustrative and that the invention is limited only by the terms of the following claims.

We claim:

1. A self-locking fastening device comprising a male threaded member having a shank portion provided with threads, a punch groove in said shank portion extending lengthwise thereof and intersecting a plurality of said threads, said groove having a bottom, substantially parallel sides and opposite end walls, a strip-like insert of elastomeric material initially narrower than said groove and expanded into tight engagement with the sides of said groove and extending outwardly beyond the roots of said threads intersected by said groove, and shavings integral with the sides of said member extending into said groove along its length and embedded in said insert for aiding in retaining said insert against endwise movement in said groove.

2. A method of making self-locking threaded fastening devices comprising punching a threaded shank portion of a fastening device inwardly from the outer end of said shank portion with a punch having a substantially rectangular cross-section to provide a groove intersecting a plurality of the threads on said shank portion, having a bottom, substantially parallel sides and end walls, shaving the sides of said groove to remove burrs and form shavings integral with said shank portion adjacent to the bottom of said groove, compressing a strip of resilient material to a transverse dimension narrower than said groove, inserting said compressed strip into said groove and coining said strip to expand it into tight frictional engagement with the sides of said groove and embed some of said shavings in said insert, said strip, when coined, having its outermost edge extending beyond the roots of the threads in said shank portion for engagement with the threads on a complemental threaded member.

3. A method of making self-locking threaded fastening devices comprising punching a threaded shank portion of a fastening device at a zone spaced from the outer end of said shank portion with a punch having a substantially rectangular cross-section to form a groove in said shank portion having a bottom substantially parallel to the axis of said shank portion, substantially parallel sides and opposite end walls, shaving the opposite sides of said groove to form integral shavings extending into said groove, compressing a strip of resilient material to a transverse dimension narrower than said groove, inserting said compressed strip into said groove and coining said strip to expand it into tight frictional engagement with the sides and ends of said groove and embed some of said shavings in said insert, said strip, when coined, having its outermost edge disposed beyond the roots of the threads in said shank portion for engagement with the threads on a complemental threaded member.

References Cited in the file of this patent

UNITED STATES PATENTS

| 2,255,948 | Swanstrom | Sept. 16, 1941 |
| 2,409,638 | Lyon | Oct. 22, 1946 |
| 2,815,787 | Podell | Dec. 10, 1957 |
| 2,913,031 | McKay et al. | Nov. 17, 1959 |
| 2,944,325 | Clark | July 12, 1960 |
| 3,010,503 | Beuter | Nov. 28, 1961 |
| 3,020,570 | Wallace et al. | Feb. 13, 1962 |

FOREIGN PATENTS

| 552,685 | Belgium | Dec. 15, 1956 |
| 490,680 | Great Britain | Aug. 18, 1938 |